United States Patent [19]
Wehhofer et al.

[11] Patent Number: 5,842,157
[45] Date of Patent: Nov. 24, 1998

[54] PROCESS FOR MONITORING A MACHINE OR INSTALLATION

[75] Inventors: Josef Wehhofer, Darmstadt; Joachim Voegele, Riedstadt; Harald Wolf, Darmstadt, all of Germany

[73] Assignee: Carl Schenck AG, Germany

[21] Appl. No.: 717,227

[22] Filed: Sep. 26, 1996

[30] Foreign Application Priority Data

Oct. 10, 1995 [DE] Germany .................. 195 37 694.3

[51] Int. Cl.⁶ ............................................. G06F 17/10
[52] U.S. Cl. ........................ 702/189; 395/902; 395/61
[58] Field of Search ...................... 364/550, 551.01, 364/552, 554; 395/1, 10, 50, 60, 61–68, 902, 911; 73/649, 658, 660; 702/134, 135, 189

[56] References Cited

U.S. PATENT DOCUMENTS

| | | | |
|---|---|---|---|
| 4,967,337 | 10/1990 | English et al. | 364/550 |
| 5,210,704 | 5/1993 | Husseiny | 364/506 |
| 5,251,151 | 10/1993 | Demjanenko | 364/550 |
| 5,511,371 | 4/1996 | Kaufmann | 57/264 |
| 5,566,092 | 10/1996 | Wang et al. | 364/551.02 |
| 5,633,800 | 5/1997 | Bankert et al. | 73/587 |
| 5,664,093 | 9/1997 | Barnett et al. | 395/50 |
| 5,710,723 | 1/1998 | Hoth et al. | 364/554 |

FOREIGN PATENT DOCUMENTS

| | | |
|---|---|---|
| A-0405149 | 1/1991 | European Pat. Off. . |
| A-4447288 | 7/1995 | Germany . |

OTHER PUBLICATIONS

H.P. Preuss: "Fuzzy Control in Process Automation" Sep. 1993, International Journal of Systems Science, London, U.K.

Engineering and Automation, Bd. 14, Nr. 6, Nov. 1, 1992, Seiten 10–11 Wegmann H: "Fuzzy Control with Simatic S5".

DD–A–205 998 (EMA Universitaet Greifswald) Jan. 11, 1984.

Primary Examiner—John E. Barlow, Jr.
Assistant Examiner—Craig Steven Miller
Attorney, Agent, or Firm—Connolly & Hutz

[57] ABSTRACT

In a process for monitoring a machine or installation, signals from sensors positioned on components of the machine or installation are transmitted to a signal-conditioning unit. Conditioned sensor signals from the signal-conditioning unit are further processed. The machine or installation components to be monitored are mapped in machine or installation objects, and the machine or installation objects are combined. Ultimately, rule-based monitoring statements are obtained utilizing the combined objects.

3 Claims, 6 Drawing Sheets

File "SIM_DIAG"

```
//
//
//
//
//      simple vibration machine diagnosis, bearings + excess load
//
//      properties:
//      model:      -    vibration monitoring
//      view:       -    input and output data (via use)
//      control:    -    (via use)
//
``` txt TextVibWarnung      // text for input terminal warning vibration uk: "limes vibration 1", ge: "Voralarm Schwingung";

txt TextVibAlarm      // text for input terminal alarm vibration uk: "limes vibration 2", ge: "Hauptalarm Schwingung"

txt TextLagerTemp      // text for input terminal warning temperature uk: "temperature warning", ge: "Temperatur erhöht";

end thread

Figure 6b

// simple diagnosis program thread diagnosis int iWarnAnz;

iWarnAnz = 0;            // occupy in advance with ok     warnung.iOut = 0;

alarm.iOut = 0;

if (lagerTemp.iIn eq 1) then warnung.iOut = 1;

iWarnAnz = iWarnAnz + 1;

endif if (lagerBcu.iIn eq 1) then warnung.iOut = 1;

iWarnAnz = iWarnAnz + 1;

endif if (vibWarnung.iIn eq 1) then warnung.iOut = 1;

iWarnAnz = iWarnAnz + 1;

PROCESS FOR MONITORING A MACHINE OR INSTALLATION

BACKGROUND OF THE INVENTION

The present invention relates to a process for monitoring a machine or installation in which signals from sensors positioned on components of the machine or installation are transmitted to a signal-conditioning unit, and in which the conditioned sensor signals can be further processed.

For purposes of operation monitoring as well as for the diagnosis and/or analysis of machines or installations, it is common practice to turn, for example, to vibration signals such as wave or bearing vibrations and to temperature measuring signals.

German Patent No. 2,410,211 discloses the monitoring of machines or installations, such as power plant machinery, turbines and pumps, by means of vibration-measuring technology or vibration analysis so as to detect and classify damage. The mean value of the stochastic signal fractions of the vibration signals measured on the machine is employed to eliminate the influence of operational and ambient parameters by means of multiplicative or additive correction functions. The corrections are difference equations whose coefficients are incrementally varied according to a search algorithm while the machine is intact, until no statistical correlation can be ascertained any longer between the corrected quantity and the operational and ambient parameters. In this manner, quantities are derived which only change essentially as a result of damage processes, thus allowing a classification of the damage. By referring to damage patterns, that is to say, characterizing changes in the vibration state in comparison to defined reference states, the damage can be classified by means of pattern-recognition methods.

Knowledge-based monitoring methods provide support for the evaluation and interpretation of measured results. German Patent No. 44 06 723 A1 discloses a knowledge-based monitoring system ("expert system") that makes it possible to derive conclusions on the basis of pattern comparisons. A method is disclosed which combines results obtained from the conditioning of vibration signals together with additional physical quantities that describe the operating state of the installation, thus generating a vector for the operating state. The normal operating state is represented by means of a reference vector having the same structure. The description of potential errors is done in an interpretation matrix (knowledge base) consisting of pattern vectors. Such pattern vectors are generated for each state that needs to be diagnosed. The reference vector is continuously compared with the currently present operating-state vector and the difference between the two vectors is formed. This difference as well as elements of the interpretation matrix form a probability statement for each element of the operating-state vector, which culminates in a total probability value of an operating state expressed by a pattern vector. The characteristic-value combination—established by a pattern vector—which is taken from the list of possible error causes and which displays the highest probability sum is output as the final-value combination that best describes the state of the installation for the state vector in question.

The publication in German titled "An expert system for the diagnosis of the status of steam turbines" (author: P. Wutsdorff, VGB Kraftwerkstechnik [power plant technology], volume 71, issue 5, May 1991, pages 426 to 430) describes an expert system for monitoring and diagnosing the status of steam turbines that is based on modeling in the form of so-called "semantic networks" as well as on knowledge representation in the form of object-attribute-value triplets. The appropriately conditioned knowledge is represented by means of combination rules in the following form: IF condition 1 AND condition 2 AND . . . THEN hypothesis 1 is true, with the ensuing actions 1, 2, . . . Here, the conditions are always comparisons of measured quantities with the mathematical expectation or hypotheses from other rules. Subsequently, a list is obtained of the deviations ascertained as well as the diagnoses ensuing from these deviations and ultimately, recommendations for individual measures. This method likewise calls for a comprehensive knowledge base which, in addition, is specifically tailored for monitoring steam turbines.

All of the monitoring processes cited call for extensive know-how on the part of the user about monitoring.

SUMMARY OF THE INVENTION

The present invention is based on the object of creating a monitoring process which can be adapted in a simple manner to all kinds of monitoring tasks and whose knowledge base is founded on the utilization and combination of knowledge bases for standardized partial monitoring.

The monitoring process according to the invention is based on a combination of partial monitoring procedures. The partial monitoring procedures are in themselves intelligent and are based on adaptive, rule-based processes. In an advantageous manner, the configuration of the total monitoring by recording application-specific monitoring components and their linking can be carried out by the users of the monitoring themselves through an adaptation to their specific requirements, since only familiar modular components are used. These components constitute the mapping of program codes in an application language suitable for this purpose. This language makes it possible to combine in a few lines of program code the data and the total functionality of modular monitoring components which are already in existence and familiar to the user. This procedure makes it possible to construct very powerful systems out of elementary components. The use of fuzzy logic simplifies the formulation of rules, since in this case simple linguistic formulations can be employed. Fuzzy logic also entails the use of self-learning operations. The functionality of partial monitoring procedures is advantageously found in a few lines of program code for the next superordinated monitoring procedure with which the subordinated partial monitoring procedures are represented. In an advantageous manner, it is also possible to built up several hierarchical levels, that is to say, the monitoring is built up so as to be recursive, whereby a combination of process objects are undertaken in each step.

BRIEF DESCRIPTION OF THE DRAWINGS

Novel features and advantages of the present invention in addition to those mentioned above will become apparent to persons skilled in the art from a reading of the detailed description in conjunction with the accompanying drawings wherein.

DETAILED DESCRIPTION OF THE INVENTION

Figure 1:
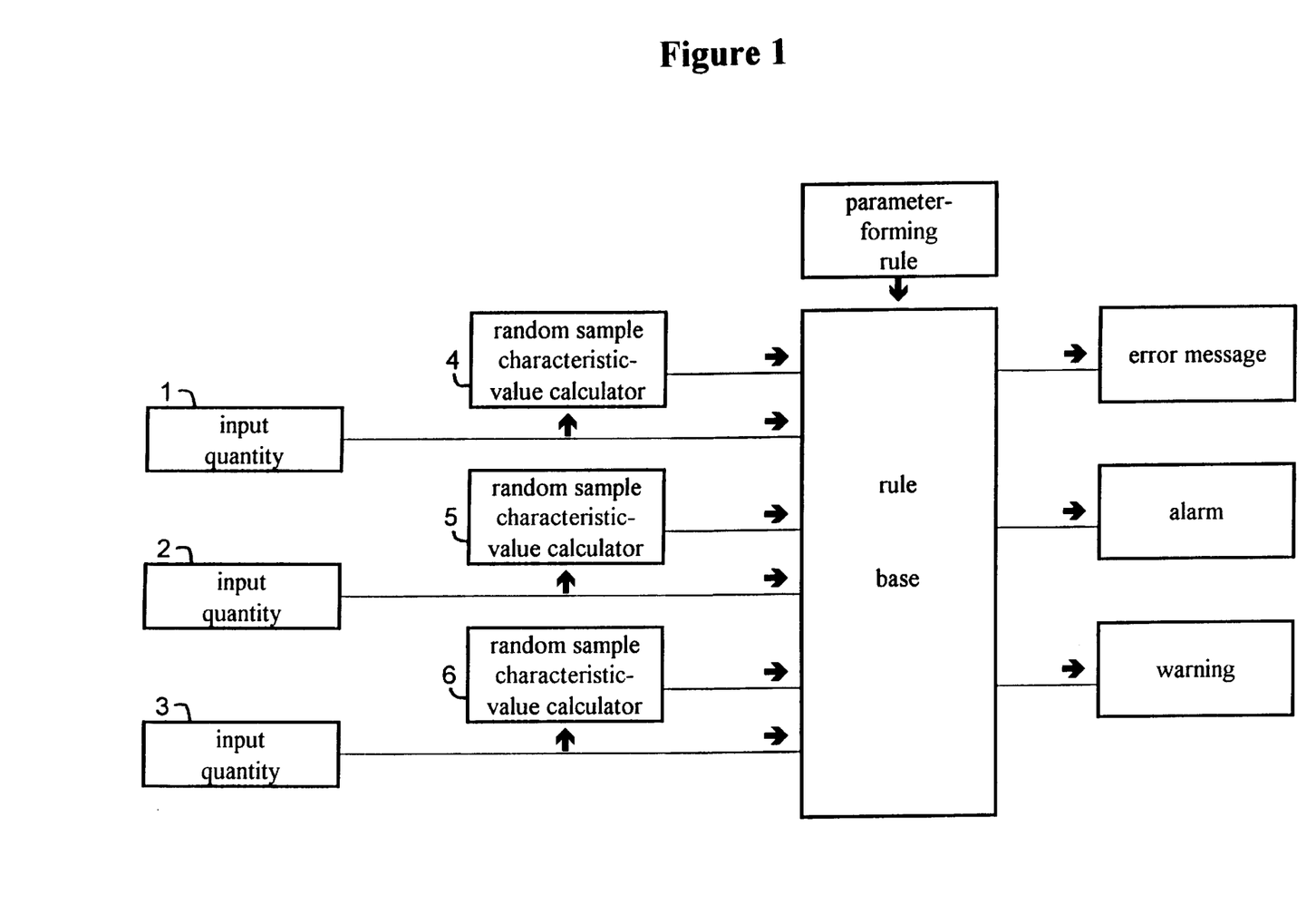
FIG. 1 is a schematic representation of a unit for monitoring an installation element, according to the present invention.

FIG. 1 schematically depicts a unit for monitoring an installation element or installation component. The monitoring unit has three input channels 1, 2, 3. If, for example, the monitoring of the bearings for a rotating part is selected, the input quantities "bearing load", "BCU value" and "bearing temperature" are transmitted to input channels 1, 2, 3. The monitoring unit processes the input signals by means of an adaptive rule-based process, whereby fuzzy logic, for instance, can constitute the foundation of the rule base. The foundations of the fuzzy rules are known, for example, from the publication in German titled "Fuzzy control—heuristic regulation by means of fuzzy logic" in "atp" (1992), 4, pages 176 through 183 and 5, pages 239 through 246. As a matter of principle, there can be any desired number of input and output quantities in fuzzy logic regulation.

The input quantities "bearing load", "BCU value" and "bearing temperature" are evaluated qualitatively such as, for example, by means of the statements "small", "medium" or "large". Association functions quantify these qualitative statements. Thus, associations to the qualitative statements are assigned to every possible numerical value of an input quantity. The number of these association functions corresponds to the number of linguistic values of an input quantity; in the example, there are three of them. The association functions form the basis for the quantitative evaluation by means of IF-THEN rules and AND or OR links which are laid down in a rule base. For a combination of linguistic values of the input quantities, as the conclusion, a linguistic value for an output quantity is obtained. In the end, the value of the output quantity is optionally calculated, a procedure which is designated as de-fuzzying.

The coordinate origin and the scaling of the association function are different as a rule and they depend on the currently present input quantities. In most cases, they can be derived in a simple manner from statistical characteristic values of the input quantities.

A learning phase is provided in order to ascertain the statistical characteristic values needed. In this context, as shown in FIG. 1, statistical characteristic values are formed on the basis of the input quantities in a random-sample characteristic-value calculator 4, 5, 6. The parameters "coordinate origin" and "scaling factor" for the individual association functions are derived from these characteristic values and from a parameter-formation rule, as described in greater detail below with reference to FIGS. 2 and 3 and the example concerning the monitoring of bearings.

Figure 2:
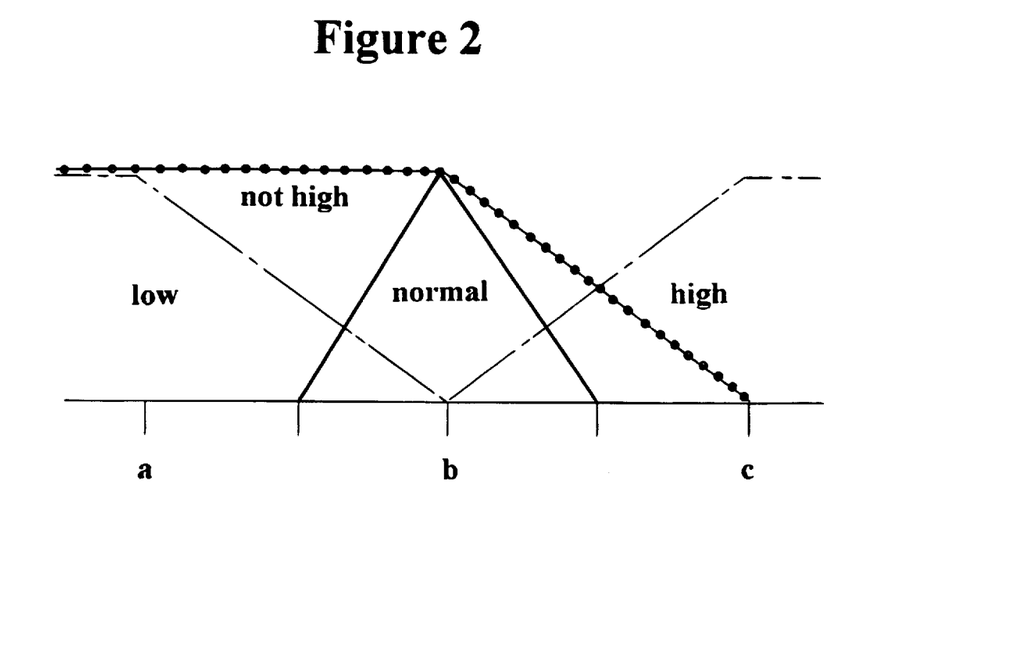
FIG. 2 diagrammatically illustrates the graphic formation of a fuzzy association function for the input quantities of the unit according to FIG. 1.

FIG. 2 shows the standardized association functions "low", "normal", "not high" and "high" formed on the basis of the data from the characteristic-value calculator and the formation rules. The association function "low" is indicated by broken lines, the association function "high" by dash-dotted lines, the association function "normal" by solid lines and the association function "not high" by a dotted line. In the case of the triangular association function "normal", the abscissa position b of the peak when considering, for example, the bearing load, constitutes the statistical mean value of the measured values for the bearing load, while the abscissa position a characterizes the association function "low" and the abscissa position c characterizes the association function "high"; a and b are likewise derived from the statistical evaluation of the measured value "bearing load".

Figure 3:
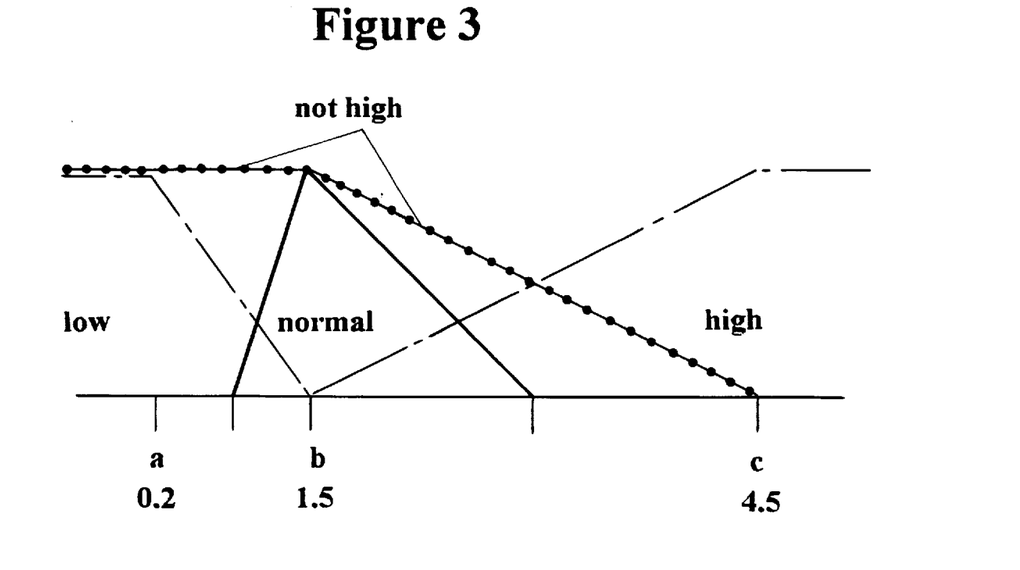
FIG. 3 diagrammatically illustrates the formation of a fuzzy association function for the input quantity "BCU" in the case of a procedure for monitoring bearings.

FIG. 3 shows the association function for the feature "BCU" (characteristic value for roller bearing damage) using the formation rule and the data from the statistical evaluation in the characteristic-parameter calculator with a=0.2, b=MIN (statistical mean value, 3), c=3b.

Rule block for the monitoring, the output quantity is the damage to the bearings:

if no rule applies, then the bearing damage is low if the BCU value is too high, then the bearing damage is very high if the BCU value is very high and the temperature is high, then the bearing damage is very high if the BCU value is not low and the temperature is too high, then the bearing damage is high if the bearing load is high and the BCU value is high and the temperature is not high, the then bearing damage is low if the temperature is very high and the BCU value is high, then the bearing damage is high if the BCU value is not high, then the bearing damage is normal if the BCS inner ring is too high, then the bearing damage is too high if the BCS outer ring is too high, then the bearing damage is too high if the BCS cage is too high, then the bearing damage is too high if the BCS rolling element is too high, then the bearing damage is too high In this manner, the rule base is present and parametrized, and the monitoring function can be activated. Employing the rule base, it is possible to obtain, for example, the statement: "damage to the inner ring of the roller bearings" as the output quantity or else just the triggering of an alarm, for which purpose the following program, LAGER.UEB, serves:

Program code:

(File LAGER.UEB)

In the application language, the monitoring part for the monitoring of the bearings reads as follows;

// Applying the input quantities:

use "lagerlst.mes" as bearing load use "bcu.mes" as bcu use "temprtur.mes" as temperature use "bcs.mes" as bcs // Applying the adapted association functions and initialization of the characteristic-value calculator with the value from which the statistical value is to be formed:

use "lagerlst.fuz" as Flagerlast (statistical value=bearing load.value);

use "bcu.fuz" as Fbcu (statistical value=bcu.value);

use "temprtur.fuz" as Ftmp (statistical value= temperature.value);

use "bcs.fuz" as Fbcsi (statistical value=bcs.inner ring);

use "bcs.fuz" as Fbcsa (statistical value=bcs.outer ring);

use "bcs.fuz" as Fbcsw (statistical value=bcs.roller bearings);

use "bcs.fuz" as Fbcsk (statistical value=bcs.cage);

```
Fuzzy output bearing damage      // applying the fuzzy output
variables
rules                            // beginning of the fuzzy block
    ifrule( )               bearing damage = low;    // default
    ifrule(Fbcu eq too_high)      bearing damage =
```

-continued

```
    very_high;
    ifrule((Fbcu eq too_high) and (Ftmp eq high))
                    bearing damage = very_high;
    ifrule((Fbcu not low) and (Ftmp eq too_high))
                    bearing damage = high;
    ifrule((Flagerlast eq high) and (Fbcu eq high) and (Ftmp
    not eq high))
                    bearing damage = low;
    ifrule((Ftmp eq very_high) and (Fbcu eq high))
                    bearing damage = high;
    ifrule (Fbcu ne high)           bearing damage =
    normal
    ifrule(Fbcsi eq too_high)       bearing damage =
    too_high;
    ifrule(Fbcsa eq too_high)       bearing damage =
    too_high;
    ifrule(Fbcsk eq too_high)       bearing damage =
    too_high;
    ifrule(Fbcsw eq too_high)       bearing damage =
    too_high;
    ifrule((Ftmp eq high) and (Fbcu eq very_high))
                    bearing damage = too_high with 4;
end rules
if (bearing damage.value > 1.)      bearing damage
alarm = 1;
```

Here, Fbcsi, Fbcsa, Fbcsk and Fbcsw are characteristic values for the recognition of damage on commonly employed roller bearings with an inner ring (index i), outer ring (index a), roller bearings (index w) and cage (index k).

Figure 4:
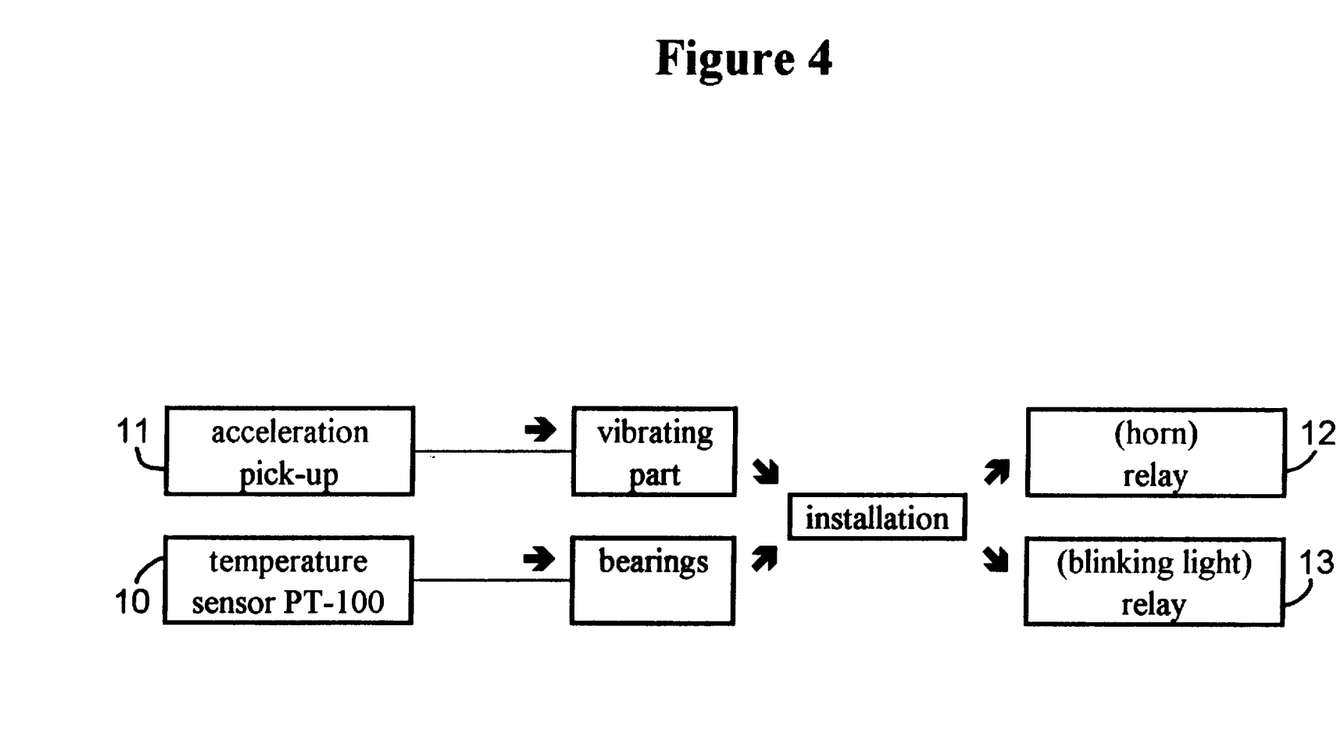
FIG. 4 is a schematic representation of an installation-monitoring unit.

FIG. 4 depicts the total monitoring of an installation for bearing damage and vibration.

For this purpose, a temperature sensor 10 and, for example, two acceleration pick-ups 11 are mounted on the components of the installation to be monitored (bearings, vibrating part). The monitoring result is available visually and acoustically at relays 12, 13.

In order to install an application-specific total monitoring system as depicted in the example according to FIG. 4, the necessary process objects (inventory) are gathered from a supply of components, as in the following example:
    sensors:
        one (two) acceleration pick-up(s) 11
        one temperature sensor 10 (PT-100)
    actors:
        one horn 12 for alarm/switch-off
        one blinking light 13 for warning machine objects:
        bearings (program SIMLAGER or LAGER.UEB)
        vibrating part (program SIM_VIB)
    super object:
        summary of the vibration monitoring (program SIM_DIAG)

The process objects involved are connected to each other by means of "wiring". In the example, the sensors 10, 11 are connected to the machine objects, the outputs of the machine objects are connected to the super object and the outputs of the super object are connected to the actors 12, 13. The sensors 10, 11 are physically affixed to the appropriate components. In the example, the accelerator pick-up 11 can be employed several times, namely, for monitoring the bearings and the vibration, which is reflected in the wiring.

The total monitoring is designed in a modular fashion and, in the example, as one of the modules, it comprises the monitoring of the bearings explained with reference to the program code "LAGER.UEB" or a similar module like the "SIMLAGER" described below.

Figure 6A:
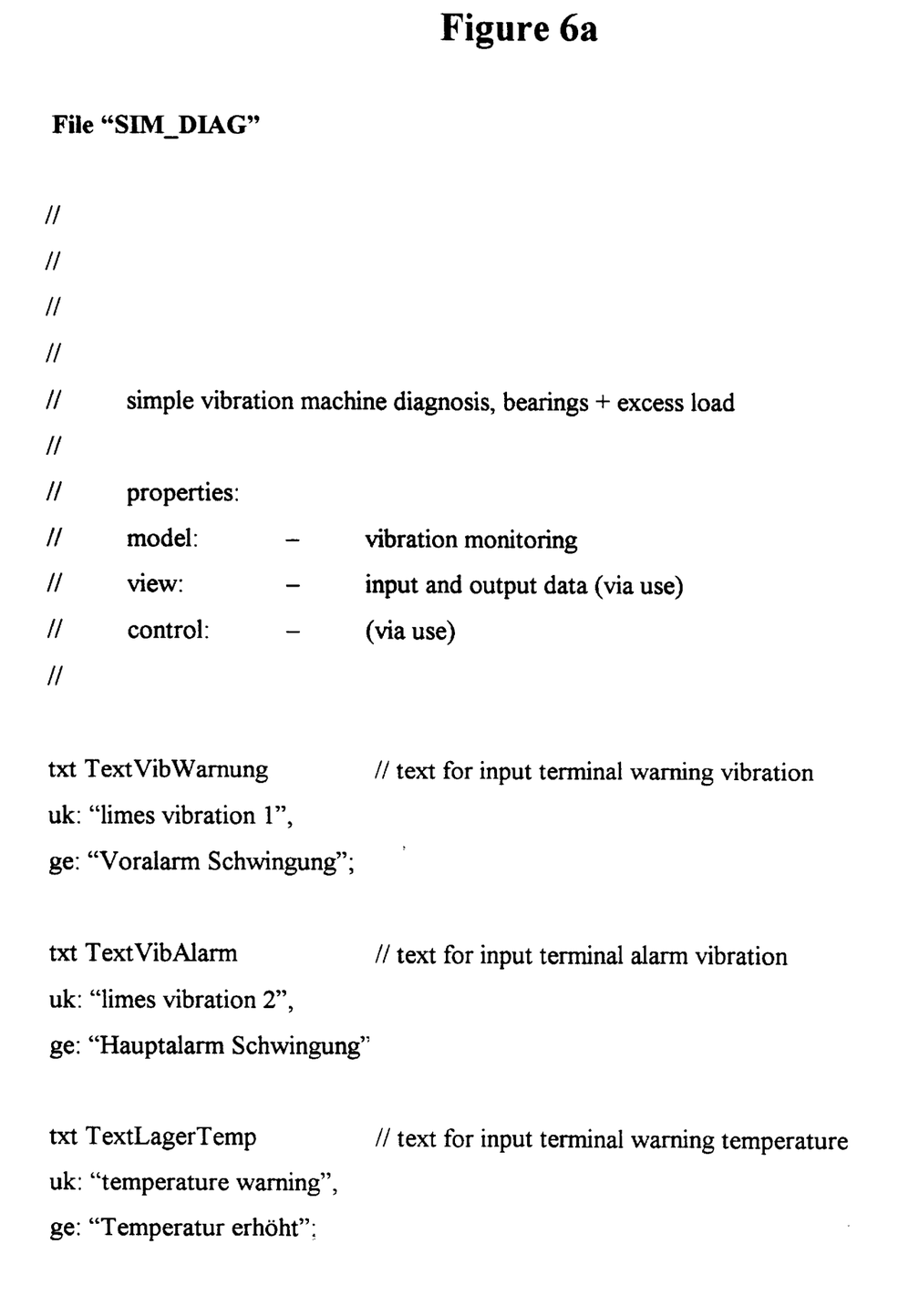
FIGS. 6a and 6b contain program code SIM_DIAG for vibration monitoring.
Figure 6B:
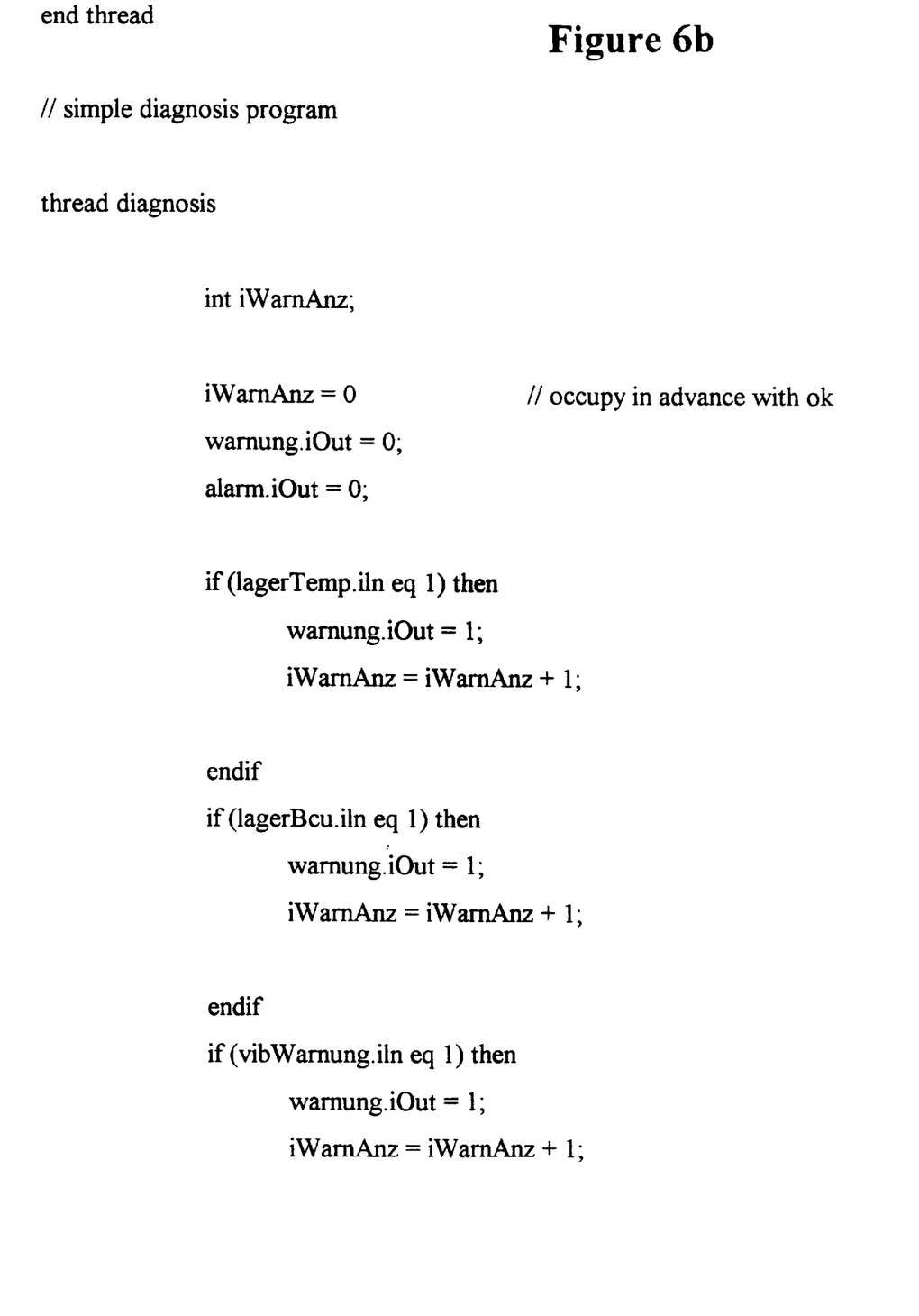

It is easy to generate a new machine object, for instance, for monitoring vibration, by simply changing the program SIM_VIB, while this can be done for monitoring bearings by changing the program SIMLAGER; in a similar manner, a new super object is generated by changing the program SIM_DIAG (FIG. 6).

All of the sensors and actors, the measuring devices, auxiliary files for the fuzzy regulations, measured values and limit values are made available in the program code.

The program code segment file "PT-100.INP" below shows, for example, the incorporation of the temperature sensor 10 (PT-100).

File "PT-100.INP"

```
//  sensor PT-100
//
//  properties
//      model:   -   makes the C++ object available for the sensor,
//                   allows inventory and wiring
//      view:    -
//      control: -   (via use)
//
txt TextSensorName              // name of the sensor
uk: "PT-100";
txt TextNameKl                  // name of the output terminal
uk: "temperature",
ge: "Temperatur"
txt TextTypeKl                  // terminal type
uk: "t";
ref SensorObject;               // reference to the actual
                                // C++ sensor object
float fNennWiderstand = 100.0   // nominal resistance
float fLeitWiderstand = 0;      // line resistance
float fAktWiderstand;           // currently present resistance
int iWidUpdate = 1;             // default update rate = once per hour
// withdraw terminal but convert the value range
use "VIBRO-IC.KL" as terminal (     iKlMin = 3,
                                    iKlMax = 4,
                                    iKlDef = 3);
thread init                     // initialization program
    SensorObject = new("PtWiderstand"); (resistance)
    SensorObject.name(TextSensorName);
        SensorObject.init(      klemme.iSlotNo,     // number
    of the measuring module (1 . . . 4)
                    klemme.iChannelNo,  // hardware terminal on the
    module (1–n)
                    fNennWiderstand,    //   nominal resistance
    e.g., 100 for PT100)
                    fLeitWiderstand,    // line resistance
                    fAktWiderstand,     //   currently present
resistance for possible views
                    iWidUpdate);        // resistance
        SensorObject.stub("output",     // output terminal
                    TextNameKl,         // name of the output
                    TextTypleKl         // list of the categories
                    );                  // end of the list
end thread
```

The following program code segment SIMLAGER forms a machine object for simple monitoring of bearings with only the temperature and BCU values on the rule base of exact formulations, whereby this program code segment differs from the above-described program code segment LAGER.UEB in that it does not make use of fuzzy logic and also dispenses with the use of the measured value "bearing load".

File "SIMLAGER"

```
//  simple bearings monitoring (only temperature and BCU)
//
//  properties:
//      model:   -   monitoring of bearings
//      view:    -   input and output data (via use)
//      control: -   (via use)
//
```

-continued

File "SIMLAGER"

```
txt TextLimTemp              // text for limit value "temperature"
uk: "limes temperature",
ge: "Grenzwert für Lagertemperatur";
txt TextLimBcu               // text for limit value "BCU"
uk: "limes BCU",
ge: "Grenzwert für BCU";
txt TextLagerAlarm           // name of output terminal for
bearing alarm
uk: "warning";
ge: "Lagerfehler";
txt TextTempAlarm            // name of output terminal for
temperature alarm
uk: "high temperature";
ge: "Temperatur zu hoch";
txt TextBcuAlarm             // name of output terminal for BCU
alarm
uk: "BCU high";
ge: "BCU-Wert zu hoch";
use "TEMPERAT.MES" as temp;  // temperature measurement
use "BCU.MES" as bcu;        // BCU measurement
use "Simple.LIM" as limTemp( // limit value for temperature
measurement
               TextLim = TextLimTemp,
               fLimDef = 80.0,
               fLimMax = 150.0,
               iVerzDef = 10,
               iVerzMin = 5
               );
use "Simple.LIM" as limBcu(  // limit value for 1
               TextLim = TextLimBcu,
               fLimDef = 5.0,
               fLimMax = 100.0,
               iVerzDef = 20,
               iVerzMin = 10
               );
use "INTEGER.OKL" as bcuAlarm(TextNameKl = TextBcuAlarm);
use "INTEGER.OKL" as tempAlarm(TextNameKl = TextTempAlarm);
use "INTEGER.OKL" as lagerAlarm(TextNameKl = TextLagerAlarm);
// initialization program for the simple bearings
thread init
               every (5, s) activate control;
end thread
// monitoring program for the simple bearings
thread control
               if (bcu.fBCU gt limBcu.rLim) then
                   bcuAlarm.iOut = 1;
               else
                   bcuAlarm.iOut = 0;
               endif
               if (tem.fTemp gt limTemp.rLim) then
                   tempAlarm.iOut = 1;
               else
                   temp.alarm.iOut = 0;
               endif
               if ((bcuAlarm.iOut eq 1) and (tempAlarm.iOut eq 1))
               then
                   LagerAlarm.iOut = 1;
               else
                   LagerAlarm.iOut = 0;
               endif
end thread
```

The machine object SIMLAGER.PR (bearings) and the machine object SIM_VIB (vibration)—the latter of which was not elaborated upon here in greater detail—together yield the super object SIM_DIAG (FIG. 6) for the total vibration monitoring. The evaluation takes place on the basis of familiar "clear" rules; the machine objects and the super object, however, can also be formulated with fuzzy rules, as can be seen with the machine object LAGER.UEB.

Figure 5:
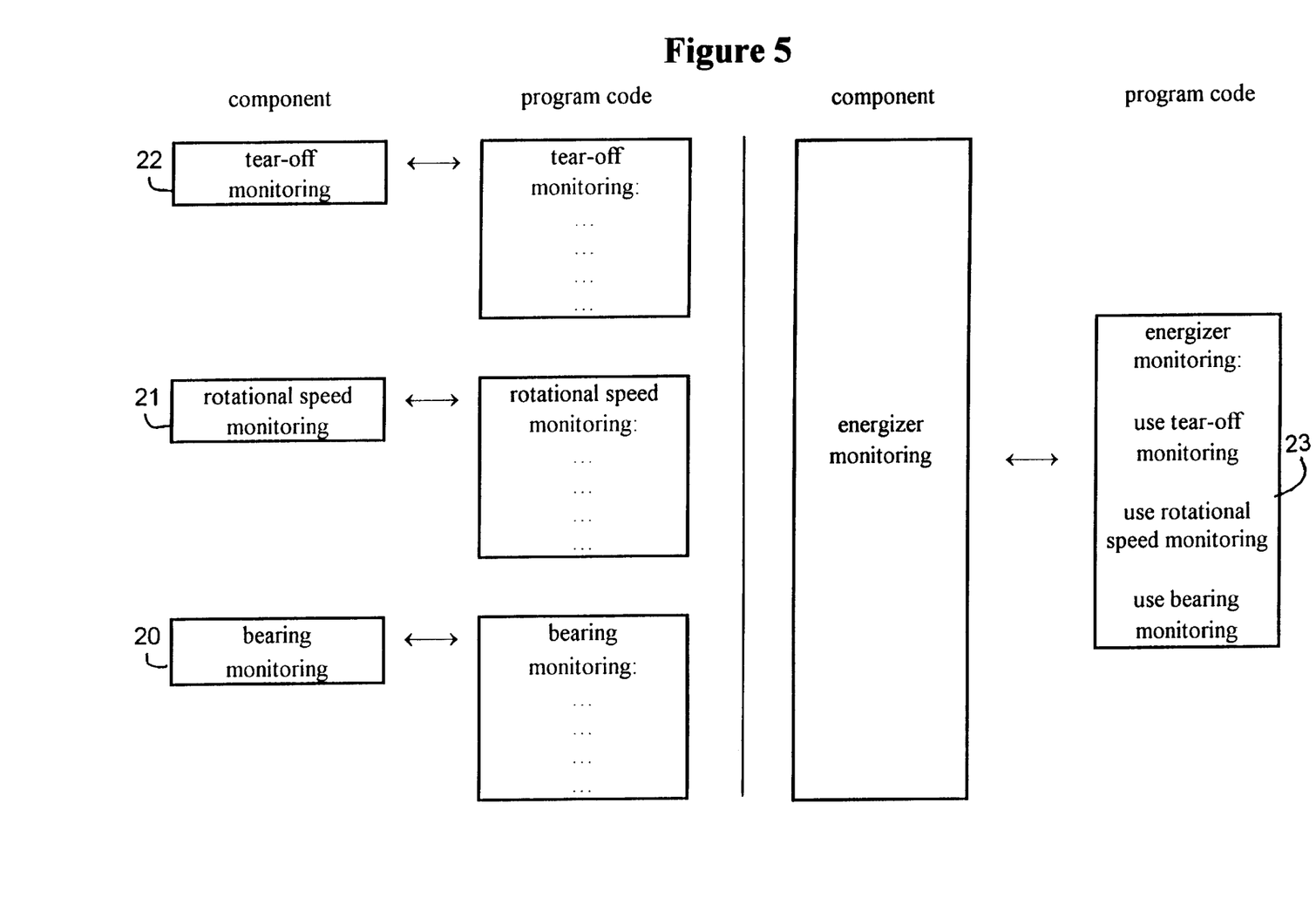
FIG. 5 is an overview of a complex monitoring arrangement.

As another example, FIG. 5 shows the total monitoring of a vibration machine with vibration energizers, abbreviated as "energizer monitoring". The modules or machine objects already realized, namely, bearing monitoring 20, rotational speed monitoring 21 and tear-off monitoring 22 (FIG. 5, left-hand part), are all combined with each other in the total monitoring (super object) (FIG. 5, right-hand part), in order to yield authoritative monitoring information.

In the representation in FIG. 5, left-hand part, the module block "Lagerüberwachung" [bearing monitoring] represents, for example, the program code of the bearing monitoring program LAGER.UEB listed above.

In the representation in FIG. 5, right-hand part, the line "use Lagerüberwachung" [bearing monitoring] in the program code block 23 represents the processing of the program module "LAGER.UEB".

Thus, it is achieved in an advantageous manner that the data and the functionality of monitoring components are found in a few lines of program code for the next superordinated component, in this case, the super object energizer monitoring.

We claim:

1. A process for monitoring a machine or system comprising a first step where the overall monitoring of the machine or the system is made by the linkage of monitoring subfunctions determined in compliance with the machine or system components, a second step where sensor signals to machine or system components are acquired as input variables and transmitted to a signal processing, a third step where the output variables of signal processing are processed to characteristics by means of an adaptive, control-based process, a fourth step where a control basis is generated for each machine or system component to be monitored, a fifth step where the obtained characteristics are evaluated in the monitoring subfunctions as per quantity by means of a membership function, a sixth step where the control basis is processed by means of the quantified characteristics and the output variables are obtained by defuzzification, a seventh step where the output variables of the monitoring subfunctions obtained in such a way are transmitted to the overall monitoring and an eighth step where these variables are combined in the overall monitoring by means of conventional or fuzzy logics to a monitoring information.

2. A process as in claim 1 wherein the conditioned sensor signals are further processed in a grouped and rule-based manner.

3. A process as in claim 1 wherein the monitoring is built up in a recursive manner.

* * * * *